United States Patent [19]
Casey et al.

[11] Patent Number: 5,174,336
[45] Date of Patent: Dec. 29, 1992

[54] GENERAL PURPOSE FLUID CONTROL VALVE

[75] Inventors: Gary L. Casey, Troy; William C. Eddy, West Bloomfield; Jack R. Phipps, Novi, all of Mich.

[73] Assignee: Allied-Signal Inc., Morris Township, Morris County, N.J.

[21] Appl. No.: 708,555

[22] Filed: May 31, 1991

[51] Int. Cl.⁵ .............................................. F16K 31/06
[52] U.S. Cl. ............................ 137/625.5; 251/129.15; 137/550
[58] Field of Search ................ 251/129.15; 137/625.5, 137/625.65, 550

[56] References Cited

U.S. PATENT DOCUMENTS

| | | | |
|---|---|---|---|
| 2,886,063 | 5/1959 | Ray | 137/625.5 X |
| 3,529,620 | 9/1970 | Leiber | 137/625.65 X |
| 3,977,436 | 8/1976 | Larner | 137/625.65 |
| 4,425,767 | 1/1984 | Barbier | 251/129.15 X |
| 4,638,974 | 1/1987 | Zeuner et al. | 251/129.15 |

Primary Examiner—Arnold Rosenthal

[57] ABSTRACT

A fluid control valve (10) comprising: a fluid carrying core (12) and separatable magnetic field generating portion (14). The fluid carrying core (12) comprises: a magnetic armature (30) movable through a working gap (32) within a thin walled tube (34). The armature includes a first plurality of grooves (100) to permit fluid flow thereacross. The tube is joined to a magnetic first member (50) in a manner to form a leak-free seal (56) generally at one end of the tube. A second member (80) partially seals the other end of the tube and includes second flow means a second plurality of axial grooves (84) for receiving fluid carried to the valve (10) and for communicating same with the armature (30). Various passages are provided to carry fluid to and from the valve. The position and number of passages permit the valve to be used as a two-way valve or as a three-way valve passage means (88;64) for transporting fluid away from the valve (10).

14 Claims, 3 Drawing Sheets

GENERAL PURPOSE FLUID CONTROL VALVE

BACKGROUND AND SUMMARY OF THE INVENTION

The present invention relates to a general purpose control valve which may be configured with minor modifications as a two-way valve or a three-way valve. The control valve may be used in a general fluid environment including both liquid and gas.

There exists a need in various automotive systems for a solenoid valve that is digital in nature and can be used to open a circuit on command (two-way valve) or to direct fluid in one of two directions (three-way valve). Typical automotive uses of these valves are in anti-skid brakes (using silicon or organic fluid at 1500 psi), turbocharger controls (using engine oil at 100 psi) and fuel injectors (using oil, gas, alcohol). It can be seen that these applications cover a wide range of pressures and working fluids. It is usually the case though not economical, to design, tool and manufacture a unique valve for each application. It is the intent of this invention to propose a common valve design that can be used for many applications and which is also very economical to tool and manufacture.

In the present invention a valve is shown with no internal elastomeric seals. The valve uses a thin tube to provide structural support for the valve seats and seal the working fluid. This concept dramatically reduces assembly cost and improves reliability and fluid/component part compatibility. The magnetic circuit is optimized in such a way that less electrical power and a smaller coil can be used to obtain a given performance level. The design of the coil allows for several applications to be satisfied with greatly simplified manufacturing procedures. Integrating these design concepts in a single valve design requires only about half the number of parts as a conventional design.

It is an object of the present invention to provide a fluid control valve which is flexible in design and uses a reduced number of components as compared to valves in the prior art. A further object of the present invention is to provide a valve having no elastomeric seals and as such, to eliminate the degradation in performance which often arises because of the degradation of these seals due to the reaction with a caustic fluid environment.

Accordingly, the invention comprises: a fluid control valve comprising a fluid carrying core and a separate magnetic field generation portion. In the preferred embodiment of the invention the fluid carrying core is devoid of internal elastomeric seals. An alternate embodiment shows a valve having such seals for use in a low pressure medium such as air The fluid carrying core comprising: a magnetic armature responsive to a magnetic force movable through a working gap within a thin walled tube. The tube includes first and second ends. The armature includes first flow means, such as a plurality of grooves, about its periphery to allow fluid to flow from one end to another end. The valve includes a a magnetic first member comprising: a first portion tightly fit in the first end and a shoulder. The tube is joined to the first member proximate the shoulder to form a leak-free seal. The valve includes a second member having a first part received within the second end of the tube and secured thereto. The first part includes second flow means, such as a plurality of second grooves and for receiving fluid carried to the valve and for communicating same with the armature and passage means for transporting fluid away from the valve. A spring may be provided in an annulus formed between the first member and the tube. The magnetic field generation portion is alternately shown as being of a concentric cylindrical or U-shaped construction.

DETAILED DESCRIPTION OF THE DRAWINGS

Figure 1:
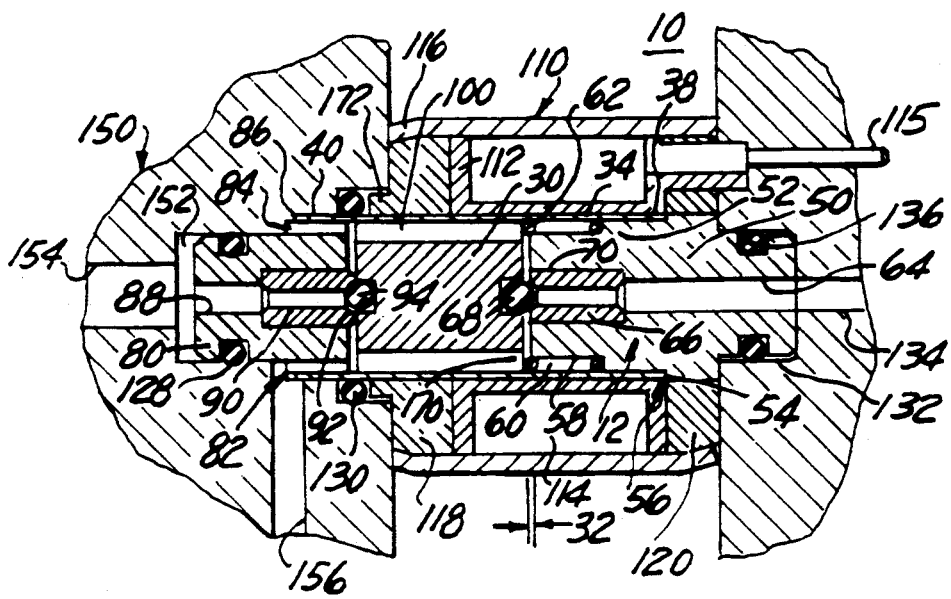
FIG. 1 illustrates a three-way valve constructed in accordance with the present invention.

FIGS. 1–4 illustrate a fluid control valve 10 configured as a three-way hydraulic valve. The valve 10 comprises a fluid carrying core portion generally shown as 12 and a magnetic field generating portion generally shown as 14. The fluid carrying portion of the valve 10 comprises an armature 30 movably disposed within a thin walled sleeve or tube 34 through a working gap 32. The tube 34 may be fabricated of a non-corrosive material such as 305 stainless steel or alternatively may be magnetic. In the preferred embodiment of the invention, the tube is formed by a known drawn-over-mandrel process such that any imperfections in the interior wall of the tube are axially directed. The tube includes a first end 38 and a second end 40.

The first end 38 of the tube 34 abuts and is piloted by a first member 50. The first member 50 includes a narrowed portion 52 which is tightly fitted against the inner wall of the tube 34 with the end of the tube 34 butted against the shoulder 54. A fluid tight seal is obtained by welding the end of the tube 34 to the first member 50 proximate the shoulder 54. The fluid tight or leak-free seal is generally shown as 56. Either electron beam or laser welding has shown to be adequate to provide such a strong, leak-free seal 56. In the preferred embodiment of the invention the first member is magnetic, that is, it is chosen from a material which exhibits a low magnetic reluctance and forms a stator in a magnetic circuit. The first member includes a second narrowed portion 58 which in concert with the sleeve or tube 34 forms an annulus 60. Positioned within the annulus is a spring 62 which urges the armature 30 away from the first member 50. In the embodiment of the invention shown in FIG. 1, the first member also includes a fluid passage 64, the interior end of which is fitted with a hardened valve seat 66 for receiving a sealing member 68 carried by the armature 30. In the embodiment shown the sealing member 68 comprises a ball and the operative seating surface 70 is generally conically shaped.

Inserted within the other end 40 of the tube 34 is a second member 80 which forms an adjustable valve seat which is slideably received within the tube 34 and positioned to adjust the stroke or working gap 32 of the armature 30. In the preferred embodiment of the invention the second member 80 is non-magnetic and typically may be constructed of 303F stainless steel. The second member 80 includes a first portion 82 the diameter of which is substantially equal to the inner diameter of the tube 34. The second member includes a plurality of axially extending grooves 84 positioned about the periphery of the first portion 82. After the working gap 32 of the valve 10 is set, the second member 80 is welded to the tube 34 at location 86. As will be seen from the discussion below, this weld need not provide a leak-free seal and as such may be accomplished by techniques using a laser, arc or resistance weld. The second member 80 may also include a second fluid carrying passage 88, and a hardened valve seat 90 having a conically shaped seating surface 92. The seating surface 92 receives another valve element 94 such as a ball which is secured to the armature 30.

Figure 2:
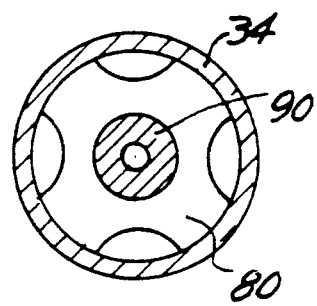
FIG. 2 shows a cross-sectional view taken through Section 2—2 of FIG. 1.

FIG. 2 illustrates the relationship of the grooves 84 of the second member 80 and the tube 34.

Figure 3:
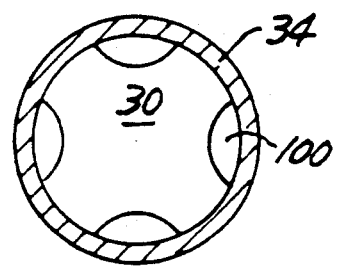
FIG. 3 illustrates another cross-sectional view taken through Section 3—3 of FIG. 1.
Figure 4:
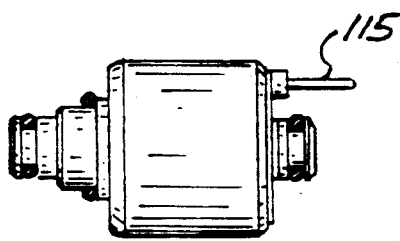
FIG. 4 illustrates an isolated plan view of a valve.

The armature 30 is fabricated of a high-quality magnetic material such as silicon iron and is preferably chrome plated for corrosion and wear resistance. Axial slots, grooves or drilled holes 100 are located about the periphery of the armature 30 to allow fluid to flow axially across the armature. The relationship of the grooves 100 and the sleeve 34 are shown in FIG. 3.

The magnetic field generating portion 14 of the valve 10 comprises a coil assembly generally shown as 110. While the coil assembly 110 can be permanently attached to the hydraulic portion 12 of the valve 10, this is not the case. In the preferred embodiment of the invention wherein the coil assembly 110 is slideably received about the hydraulic portion 12 of the valve 10 making for easy manufacture and assembly. The coil assembly 110 comprises a non-magnetic bobbin 112 about which is received a number of turns of wire generally shown as coil 114. The ends of the coil of wire are secured to respective terminals 115 (only one of which is shown). The bobbin 112 is contained within an external, magnetic tube 116 that also restrains end pole pieces 118 and 120. This construction allows a great deal of freedom in the design of the coil assembly 110 in that the terminals 115 can be located at either end of the bobbin 112. The terminals 115 can extend axially or radially therefrom and can be in the form of wires instead of connector pins.

As mentioned above, the embodiment of the valve 10 shown in FIGS. 1-4 is a three-way valve. This valve 10 is designed to fit within a cooperating structure generally shown as 150. This structure 150 may comprise a bore 152 having an exit passage 154 and an inlet passage 156 situated to carry fluid to the axial passages or grooves 84. External seals such as 128 and 130 may be provided to achieve sealing between the valve 10 and the structure 150. The other end of the valve 10 may be received within another bore 132 having an exit passage 134. Another exterior seal such as 136 may be provided about the first member 50. As mentioned, the valve 10 utilizes a relatively thin tube 34. In the preferred embodiment of the present invention the thickness of this tube is approximately 0.013 inches (0.33 mm). When the valve 10 is situated within the structure 150 it is desired that the tube not be stressed. As such, as shown in FIG. 1, the valve 10 is arranged such that any clamping forces of the structure 150 on the valve 10 are through the external tube 116 of the coil assembly 110.

The operation of the valve 10 shown in FIGS. 1-4 is as follows. Fluid received through passage 156 is communicated to the grooves 84 in the second member 80 and to the grooves 100 in the armature 30. In the embodiment shown spring 62 has biassed the armature 30 into the seating surface 92 and as such received fluid exits the valve 10 through passages 64 and 134. Upon activation of the coil assembly 110, the armature is urged to the right closing passage 64 and opening passage 88 whereupon fluid is caused to flow out of the valve 10 through passage 88 and the cooperating passage 154.

The stroke or working gap 32 of the armature 30 is achieved in a simple and straightforward manner. With the first member 50 secured to the tube 34, the armature 30 and the second member 80 are inserted within the tube. The second member 80 is moved to the right thereby bottoming the valving elements 68 and 94 against their corresponding seating surfaces 66 and 92. Thereafter, the second member 80 is withdrawn a predetermined distance (which is equal to the stroke 32) and welded to the tube 34 as described above.

There are a number of structural features which make the valve 10 extremely efficient. As can be appreciated, the slots 100 on the outside of the armature 30 tend to reduce eddy current losses by interrupting the outer surface of the armature. The spring 62 is located on the outside of the first member 50 (which forms a stator) rather than on the armature 30 and the diameter of the armature 30 is larger than the narrow portion 58 of the first member 50 so that any short circuiting flux will preferrably flow through the corner of the armature generally shown as 170 as opposed to attempting to flow through the annulus 60 which is of higher magnetic reluctance. As magnetic flux will tend to flow across the path of lowest magnetic resistance, the inside diameter of pole piece 118 is lengthened (see boss 172) to increase the area of the preferred flow path between the second member 80 (end piece) and the armature 30. This construction also has the effect of reducing short circuiting flux. Also as can be seen, the width of the shoulder 54 is equal to the thickness of the tube 34 so that the hydraulic portion 12 has a smooth exterior surface upon assembly of the first member (stator) 50 to the tube 34.

Figure 5:
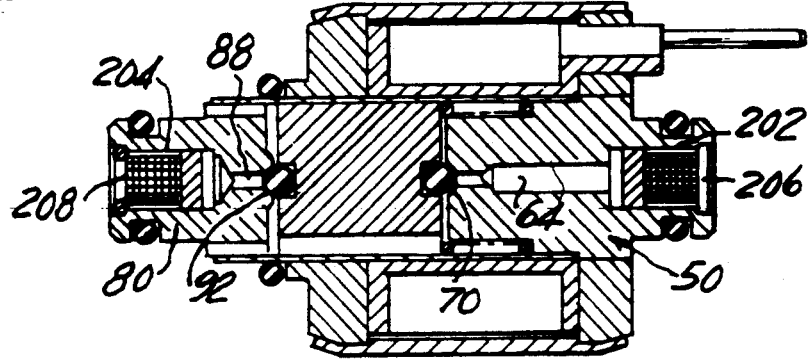
FIG. 5 illustrates a three-way valve which may be used as part of a brake system.
Figure 6:
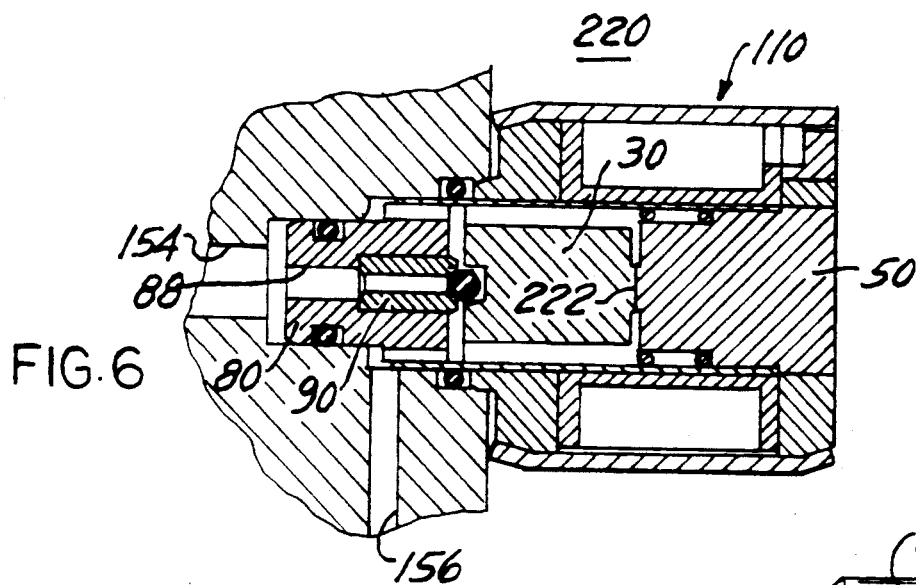
FIG. 6 illustrates an alternate embodiment of the invention showing a normally closed two-way valve.
Figure 7:
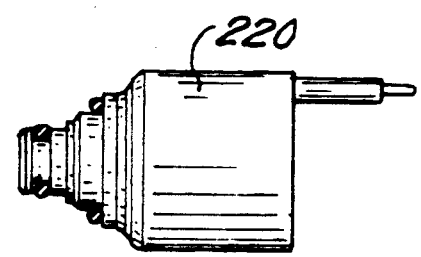
FIG. 7 illustrates a plan view of the valve shown in FIG. 6.

The basic features of the present invention have considerable design flexibility to permit the valve to be used in a number of different applications. FIG. 5 illustrates another three-way valve 200 which can be used in vehicle brake applications. The cooperating structure 150 is not shown in FIG. 5. When the valve 200 is used in a vehicle brake system the hardened valve seats 66 and 90 are not necessary. As such, the valve seating surfaces 70 and 92 are integrally formed as part of the first and second members 50 and 80 respectively. Each of the fluid passages 64 and 88 is formed by an enlarged bore such as 202 and 204 into which is received corresponding brake fluid filters 206 and 208. The above changes to the valve 200 as compared to the valve 10 are easily achieved without changing the overall design of the valve or changing the assembly and calibrating procedures. FIG. 6 illustrates an alternate construction of a valve 220 constructed as a fluid carrying or hydraulic two-way control valve. In this embodiment the first member 50 or stator does not include the fluid carrying passage 64. In addition, it can be seen that the ball valving element 68 has been removed. However, in order to minimize surface tension between the first member (stator) 50 and the armature 30 the right hand end of the armature is fabricated with a narrow stand-off 222 to minimize the contact surface areas between the armature 30 and the stator 50 and also to provide an energized air gap therebetween. It should be appreciated that the armature 30 can be constructed by using the ball 68 which can be appropriately ground down to provide the standoff. If the valve is to be used as an injector a nozzle could be fitted to passage 88. As can be appreciated, the valve 220 shown in FIGS. 6 and 7 is a normally closed, two-way valve. A normally open version of valve 220 could be achieved by replacing the member 80 with a similarly constructed member having no internal passages such as 88 (i.e., a blank member) and retaining the original ported configuration of the first member 50 having the passage 64.

Figure 8:
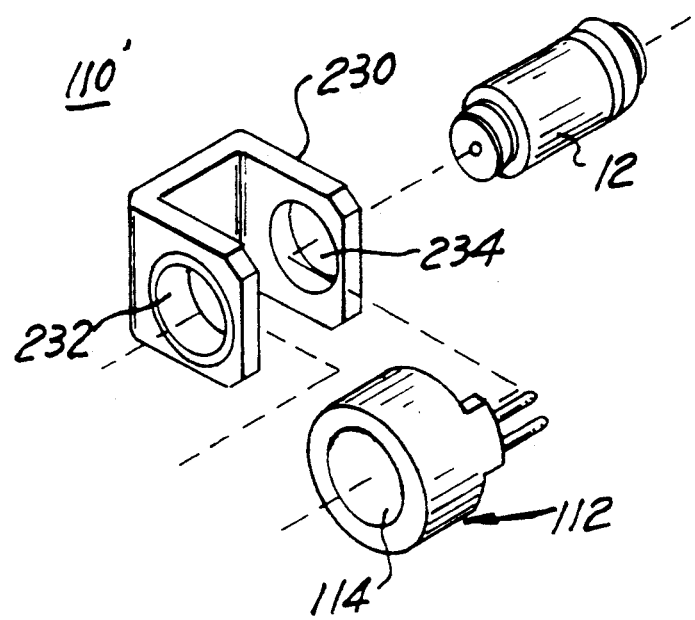
FIG. 8 illustrates an alternate embodiment of the present invention.
Figure 9:
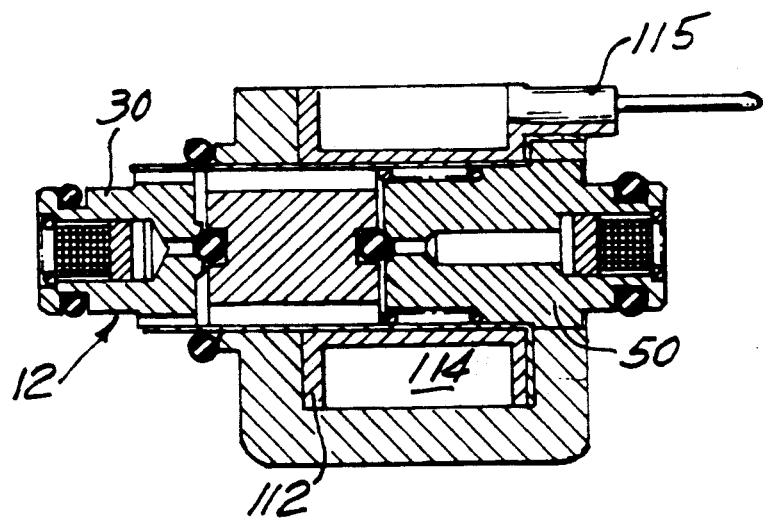
FIG. 9 illustrates an assembly view of the valve shown in FIG. 8.

Reference is made to FIGS. 8 and 9 which illustrate a simplified coil assembly 110'. This assembly 110' utilizes a generally U-shaped outer stator 230 having openings 232 and 234. The bobbin 112 holding the coil 114 is loosely positioned within the stator 230 and thereafter the hydraulic core portion 12 of the valve is inserted through the openings 234 and 232 of the stator 230 and through the opening 236 of the bobbin 112. The stator 230 could be manufactured using a sintering process or could be stamped from flat steel stock. This arrangement allows a plurality of valves to be placed in closer proximity since the stator 230 only protrudes away from the core portion 12 on one side. In this version of the valve, the terminals 115 are shown as axially extending, however, the terminals can be oriented on either side of the bobbin and extend axially or radially to permit ease of connection to a circuit board or the like.

Figure 10:
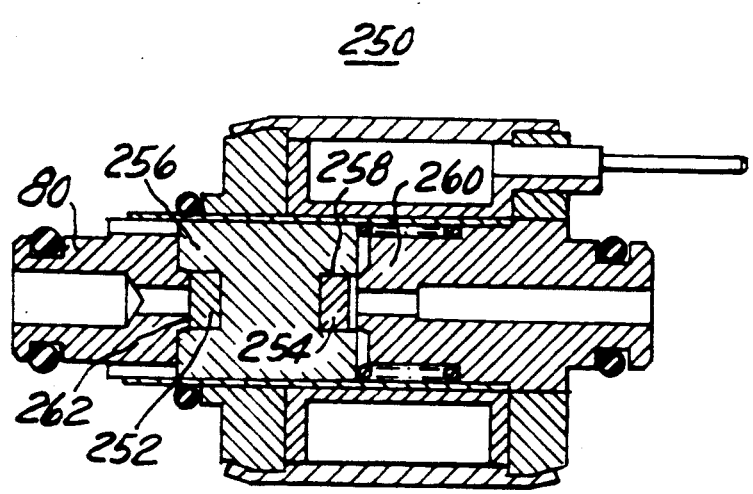
FIG. 10 illustrates a further modification of the present invention that can be used as a control valve for air or other low pressure mediums.

FIG. 10 shows a further modification of the present invention that can be used as a control valve for air or other low pressure mediums. All of the structural components of the valve 250 of FIG. 10 are substantially identical to the valve 10 shown in FIG. 1 with the exception that the ball valves 68 and 94 have been replaced by elastomeric valves 252 and 254 received within bores 256 and 258. In addition, the seating surfaces 260 and 262 in the first member (stator) 50 and second member 80 are flat.

As can be seen, the present invention provides a considerable amount of flexibility in the manufacture and application of a variety of valves. Rather simple capital equipment with low cost tooling can be used to produce the wide variety of valves for an equally wide variety of fluids, pressures and applications. The valve members 50 and 80 and armature can be fabricated using simple screw machines, the tube 50 can be obtained using a standard length of tubing stock, etc. The hydraulic portion 12 and magnetic field portions 14 can be separately fabricated and then assembled together.

Many changes and modifications in the above described embodiment of the invention can, of course, be carried out without departing from the scope thereof. Accordingly, that scope is intended to be limited only by the scope of the appended claims.

We claim:

1. A fluid control valve comprising:
a fluid carrying core comprising:
a magnetic armature responsive to a magnetic force movable through a working gap within a thin walled tube, the tube having first and second ends, the armature including a first plurality of axial passages about its periphery to allow fluid to flow from one end to another end;
a first member comprising a narrow portion slidingly received in the first end of the tube portion slidingly received end of the tube and secured thereto to provide a fluid tight seal therebetween devoid of any resilient material;
a second member slidingly received in the second end of the tube, secured to the tube and spaced from the first member and including at least one axial passage on its periphery; wherein the spacing between the first and second members defines the working gap;
passage means for transporting fluid to the tube,
a magnetic field generating portion including a coil assembly positioned exterior to the core.

2. A fluid control valve comprising:
a fluid carrying core comprising:
a magnetic armature responsive to a magnetic force movable through a working gap within a thin walled tube, the tube having first and second ends, the armature including a first plurality of axial passages about its periphery to allow fluid to flow from one end to another end;
a first member comprising a narrow portion slidingly received in the first end of the tube and secured thereto to provide a fluid tight seal therebetween;
a second member slidingly received in the second end of the tube, secured to the tube and spaced from the first member and including at least one axial passage on its periphery; wherein the spacing between the first and second members defines the working gap;
passage means for transporting fluid to the tube,
a magnetic field generating portion including a coil assembly positioned exterior to the core wherein the first member tightly fits in the first end and includes a shoulder, the tube welded to the first member proximate the shoulder to form a leak-free seal.

3. The valve as defined in claim 1 wherein the first member includes a central portion forming in concert with the tube an annulus into which is received a spring for biasing the armature away from the first member.

4. The valve as defined in claim 1 wherein the diameter of the armature is greater than the diameter of the narrow portion of the first member.

5. The valve as defined in claim 2 wherein the valve is a three-way valve and wherein the passage means comprises a first passage extending through the first member, a second passage extending through the second member, the valve further including a first valve seating surface at an inner end of the first passage and a second valve seating surface is at an inner end of the second passage and wherein the armature includes a first and second valve closure elements for selectively seating on a respective valve seating surface, such that fluid received at the second plurality of grooves is selectively communicated to the first or second passage in correspondence with the movement of the armature.

6. The valve as defined in claim 4 wherein a fluid filter is received within each first and second passage.

7. The valve as defined in claim 1 wherein the valve is a is a two-way valve and wherein the first member is devoid of any internal passages, the passage means includes a first passage extending through the second member, a seating surface at an inner end of the first passage, the armature including a valve closure element for seating on the valve seating surface, and a stand-off of reduced cross-sectional area to space the remaining portions of the armature a predetermined distance from the first member when the stand-off is contacting the first member such that fluid received at the second flow means is communicated to the first passage when the armature is moved away from the seating surface.

8. The valve as defined in claim 1 is used to control the flow of low pressure medium and wherein the first and second valve closure elements comprise the elastomeric seals.

9. The valve as defined in claim 1 the coil assembly comprises:
    a wire coil in surrounding relation to the core, first and second pole pieces on opposite sides of the coil, the first pole piece positioned about the tube and at least a portion of the armature, the second pole piece positioned about the first member, and a magnetic outer sleeve securing the first pole piece, second pole piece and coil together.

10. The valve as defined in claim 1 wherein the coil assembly comprises:
    a U-shaped, magnetic member having opposing openings therein;
    a toroidal coil defining a central opening positioned within the member and secured therein by the core which is received through the opposing openings and through the central opening.

11. The valve as defined in claim 1 wherein the second member includes a second plurality of axial passages on its periphery to allow fluid to flow thereacross.

12. The valve as defined in claim 2 wherein the coil assembly comprises:
    a wire coil in surrounding relation to the core, first and second pole pieces on opposite sides of the coil, the first pole piece positioned about the tube and at least a portion of the armature, the second pole piece positioned about the first member, and a magnetic outer sleeve securing the first pole piece, second pole piece and coil together.

13. The valve as defined in claim 2 wherein the diameter of the armature is greater than the diameter of the central narrow portion of the first member.

14. The valve as defined in claim 2 wherein the first member includes a second portion forming in concert with the tube an annulus into which is received a spring for biasing the armature away from the first member.

* * * * *